US006707641B1

(12) United States Patent
Oveyssi et al.

(10) Patent No.: US 6,707,641 B1
(45) Date of Patent: Mar. 16, 2004

(54) SPINDLE MOTOR HAVING STATOR RIM FORMED OF CONCENTRIC LAMINATE LAYERS

(75) Inventors: Kamran Oveyssi, San Jose, CA (US); Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 215 days.

(21) Appl. No.: 09/920,580

(22) Filed: Jul. 31, 2001

(51) Int. Cl.[7] ............................................. G11B 17/02
(52) U.S. Cl. .................................... 360/99.08; 310/254
(58) Field of Search ......................... 360/97.01, 99.12; 310/254–260, 268

(56) References Cited

U.S. PATENT DOCUMENTS 4,949,000 A * 8/1990 Petersen ..................... 310/254
5,264,975 A    11/1993 Bajorek et al.
6,407,466 B2 *  6/2002 Caamano .................... 310/254

* cited by examiner

*Primary Examiner*—A. J. Heinz
(74) *Attorney, Agent, or Firm*—Won Tae C. Kim, Esq.; Milad G. Shara, Esq.; Stetina Brunda Garred & Brucker

(57) ABSTRACT

A spindle motor for use in a disk drive has a spindle motor hub having an axis of rotation, an annular magnet element coupled to the spindle motor hub, and a spindle motor stator. The spindle motor stator includes a stator rim formed of a plurality of laminate layers concentrically disposed about the axis of rotation. The stator rim has a plurality of stator teeth portions in operable communication with the magnet element for rotating the spindle motor hub. The stator teeth portions each have a magnetic flux surface disposed orthogonal to the axis of rotation. The spindle motor stator has a plurality of windings distributed along the stator rim. The windings each have a winding axis parallel to the axis of rotation and being disposed about respective ones of the stator teeth.

8 Claims, 4 Drawing Sheets

SPINDLE MOTOR HAVING STATOR RIM FORMED OF CONCENTRIC LAMINATE LAYERS

CROSS-REFERENCE TO RELATED APPLICATIONS

This application is related to a U.S. application Ser. No. 09/920,596 now U.S. Pat. No. 6,594,111 filled Jul. 31, 2001 entitled "Spindle Motor Having Stator Rim Formed of Curved Arc Segments."

BACKGROUND OF THE INVENTION

1. Field of the Invention

The present invention relates generally to spindle motors for use in disk drives, and more particularly to a spindle motor having a stator rim formed of concentric laminate layers.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA) having an actuator assembly having at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes at least one transducer head, sometimes two, which is distally attached to each of the actuator arms. The actuator assembly includes the actuator body that has a bore and a pivot-bearing cartridge engaged within the bore. The at least one head gimbal assembly and the flex circuit cable assembly are attached to the actuator assembly.

The spindle motor includes a hub that is rotatably attached to the disk drive base. The hub has an outer flange that supports one of the disks. Additional disks may be stacked and separated with spacers. The spindle motor further includes an annular magnet element and a spindle motor stator. Where space efficiency is of vital concern, the magnet element is typically attached about the lowermost portion of the hub below the flange. The magnet element consists of a predetermined number of N and S poles that are disposed alternately circumferentially about the magnet element. The spindle motor stator includes an outer stator rim that is attached to the disk drive base and a plurality of internally facing stator teeth. The stator teeth are equally spaced and extend from the stator rim. The spindle motor stator is sized to fit about the hub and in particular the magnet element. Windings are oriented vertically about each of the stator teeth. The windings selectively conduct current to create a magnetic field that interacts with the various poles of the magnet element. Such interaction results in forces applied to the hub which tend to rotate the hub. In those disk drives capable of reading both sides of the disks, the head stack assembly includes an actuator arm that extends and pivots between the vertical region between the lowermost disk and the spindle motor stator.

A topic of concern is the desire to reduce the overall disk drive size. Such disk drives may have a variety of applications such as in hand held or portable electronic devices. The exterior size and shape of the disk drive is often referred to as a "form factor." Reduction of such disk drive form factor has proven challenging. This is because the mere reduction of the size of the various disk drive components may result in such components being unable to conform to required specifications.

One particular area of focus is the reduction of the height of the disk drive. As mentioned above, a prior art arrangement includes a lower actuator arm which extends and pivots between the vertical region between the lowermost disk and the spindle motor stator. Such prior arrangement is contemplated to be a limited factor in the overall sizing of the disk drive height. The mere reduction in vertical sizing of the spindle motor and its magnet element would directly reduce the total flux associated with the spindle motor which may be below acceptable specifications. Accordingly, there is a need in the art for a reduced height-to-diameter ratio spindle motor configuration which generates sufficient torque to meet acceptable specifications in comparison to the prior art.

SUMMARY OF THE INVENTION

An aspect of the present invention can be regarded as a spindle motor for use in a disk drive. The spindle motor includes a spindle motor hub having an axis of rotation. The spindle motor further includes an annular magnet element attached to the spindle motor hub. The spindle motor further includes a spindle motor stator. The spindle motor stator includes a stator rim formed of a plurality of laminate layers concentrically disposed about the axis of rotation. The stator rim has a plurality of stator teeth portions in operable communication with the magnet element for rotating the spindle motor hub. The stator teeth portions each have a magnetic flux surface disposed orthogonal to the axis of rotation. The spindle motor stator further includes a plurality of windings distributed along the stator rim. The windings each have a winding axis parallel to the axis of rotation and being disposed about respective ones of the stator teeth portions. In an embodiment of the present invention, the stator teeth portions extend from the stator rim along the axis of rotation. In another embodiment, the stator rim may be disk shaped or flat.

In additional embodiments of the present invention, there are provided disk drives each having a disk drive base. The above-mentioned spindle motors may be included the disk drives as attached to the disk drive bases.

DESCRIPTION OF THE PREFERRED EMBODIMENTS

Figure 1:
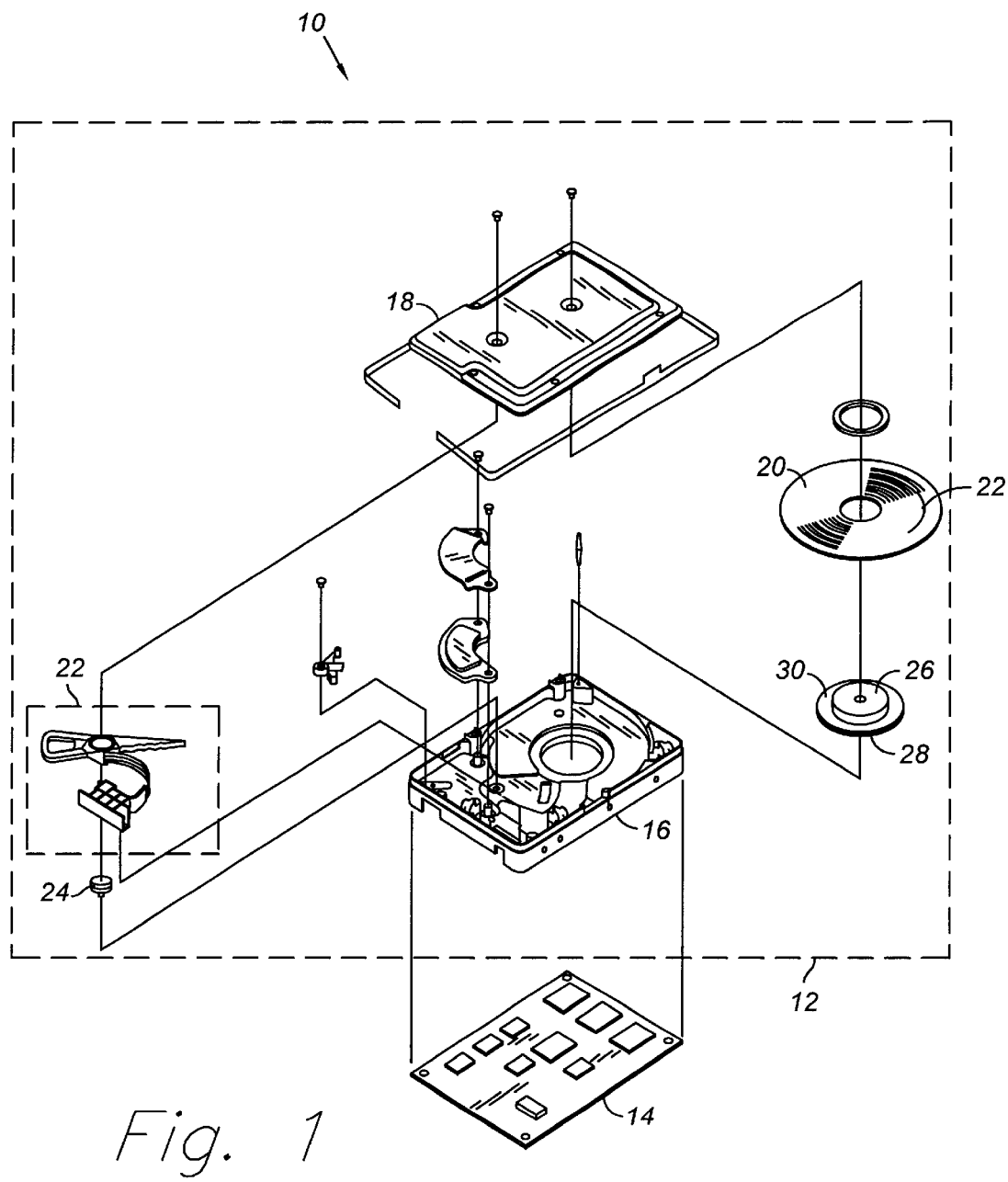
FIG. 1 is an exploded perspective view of a disk drive including a spindle motor as constructed in accordance with the present invention.

Referring now to the drawings wherein the showings are for purposes of illustrating preferred embodiments of the present invention only, and not for purposes of limiting the same, FIGS. 1–7 illustrate a disk drive 10 in accordance with the aspects of the present invention.

Referring now to FIG. 1 there is depicted an exploded perspective view a disk drive 10 constructed in accordance with an aspect of the present invention. The disk drive 10 includes a head disk assembly (HDA) 12 and a printed circuit board assembly (PCBA) 14. The head disk assembly 12 includes a disk drive base 16 and a cover 18 that collectively house at least one magnetic disk 20 (although single disk 20 is shown, multiple disks 20 may be included). The disk 20 contains a plurality of tracks 22 for reading and writing data. The head disk assembly 12 further includes a spindle motor of the present invention (such as shown in FIGS. 4 and 7 and respectively denoted as 86 and 108) for rotating the disk 20 and a head stack assembly 22. In this regard, FIGS. 2–7 depict various different embodiments of the spindle motor. A pivot cartridge 24 is provided for pivoting the head stack assembly 22 relative to the rotating disk 20 for reading and writing data to and from the disk 20. As shown in FIG. 1, the spindle motor includes a spindle motor hub 26 and an annular magnet element 28 disposed about the hub 26. The hub 26 has an annular flange 30 which is configured to support the disk 20. As FIGS. 2–7 depict various embodiments of the spindle motor, FIGS. 2–7 depict spindle motor hubs denoted 88 and 110, and magnet elements 92 and 114 as incorporated in such specific embodiments. Such hubs 88 and 110 are similar in function to hub 26 of FIG. 1.

Figure 2:
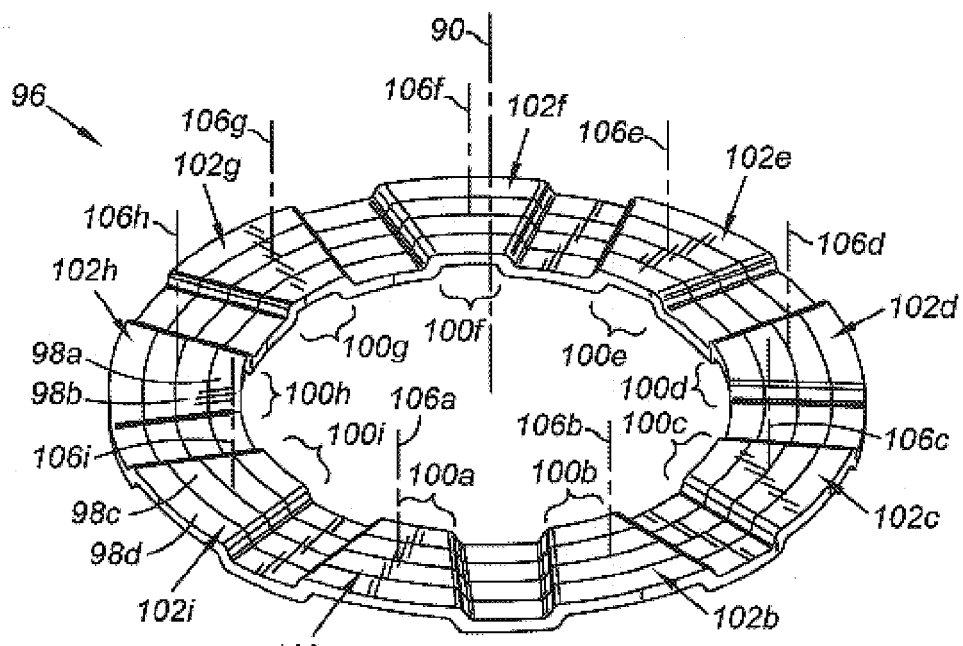
FIG. 2 is a perspective view of stator rim having protruding stator teeth portions as constructed in accordance with an aspect of the present invention.
Figure 3:
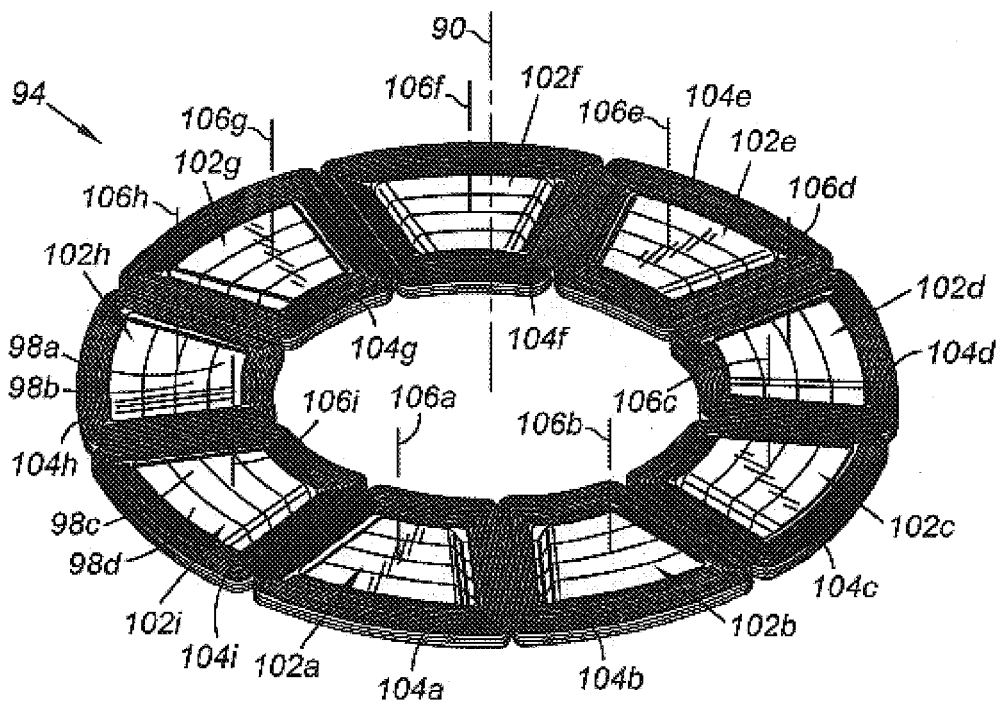
FIG. 3 is a perspective view of the stator rim of FIG. 2 as shown in connection with a plurality of windings.
Figure 4:
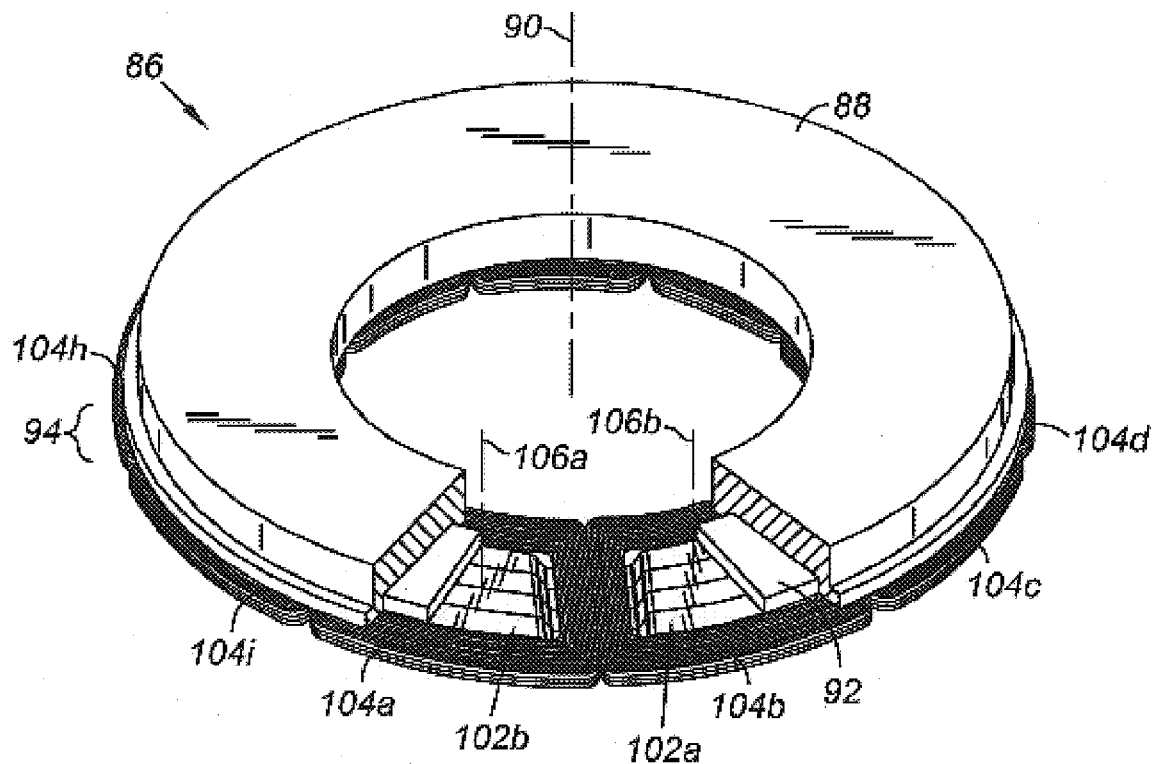
FIG. 4 is a perspective view of a spindle motor according to an aspect of the present invention including the stator rim of FIG. 3 and a spindle motor hub and magnet element.

Referring additionally now to FIGS. 2–4, according to an aspect of the present invention, there is provided a spindle motor 86 for use in a disk drive 10. The spindle motor 86 includes a spindle motor hub 88 having an axis of rotation 90. The spindle motor 86 further includes an annular magnet element 92 attached to the spindle motor hub 88. The spindle motor 86 further includes a spindle motor stator 94. The spindle motor stator 94 includes a stator rim 96 formed of a plurality of laminate layers 98a–d concentrically disposed about the axis of rotation 90. The stator rim 96 has a plurality of stator teeth portions 100a–i in operable communication with the magnet element 92 for rotating the spindle motor hub 88. The stator teeth portions 100a–i each have a magnetic flux surface 102a–i disposed orthogonal to the axis of rotation 90. The spindle motor stator 94 further includes a plurality of windings 104a–i distributed along the stator rim 96. The windings 104a–i each has a winding axis 106a–i disposed parallel to the axis of rotation 90 and is disposed about respective ones of the stator teeth portions 100a–i. In the embodiment shown, the stator teeth portions 100a–i extend from the stator rim 96 along the axis of rotation 90.

Advantageously, it is contemplated that the layered nature of the stator teeth portions 100a–i mitigate the development of eddy currents. Eddy currents undesirably reduce the magnetic flux associated with the stator motor 86 and produce excessive heat in the spindle motor 86.

In fabricating the stator rim 96, the various laminate layers 98a–d may be individually stamped, and a bending process may be performed to produce the extended stator teeth portions 100a–i. Subsequently, the laminate layers 98a–d may be grouped about each other in the concentric manner shown and glued together. In this regard, costly machining processes may be avoided. The windings 104a–i may then be affixed about the stator teeth portions 100a–i.

In addition, the spindle motor stator 94 may include molding which is formed about the stator rim 96 and the windings 104a–i. Such molding may be formed of a plastic material for example. The molding may be utilized to lock the windings 104a–i into place, as well as associated wire connections. Further, the molding may be shaped to conform to the disk drive base 16 for ease of attachment thereto. In another arrangement, the windings 104a–i may be integrated with a flex circuit material and take the form of a laminate placed upon the stator rim 96.

Figure 5:
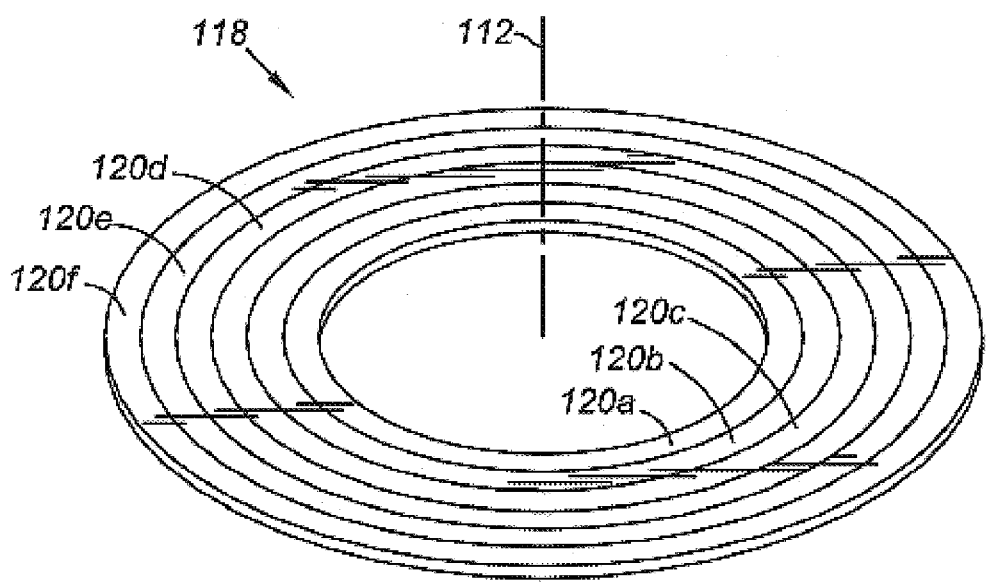
FIG. 5 is a perspective view of another flat stator rim having concentric layers as constructed in accordance with another aspect of the present invention.
Figure 6:
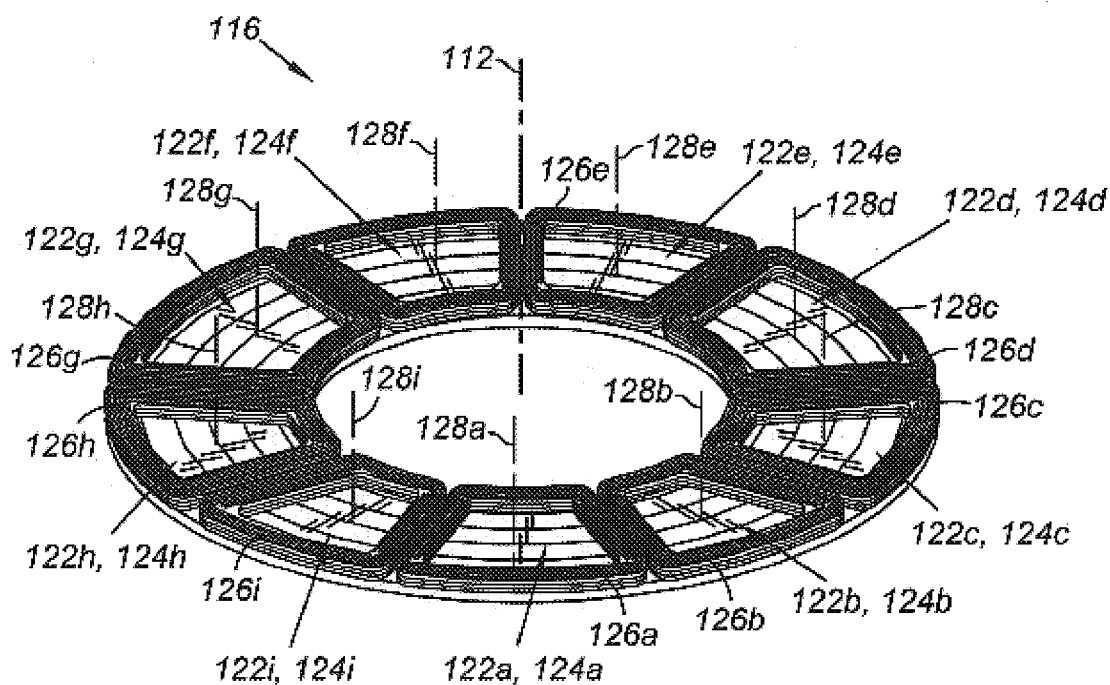
FIG. 6 is a perspective view of the stator rim of FIG. 5 as shown in connection with a plurality of windings.
Figure 7:
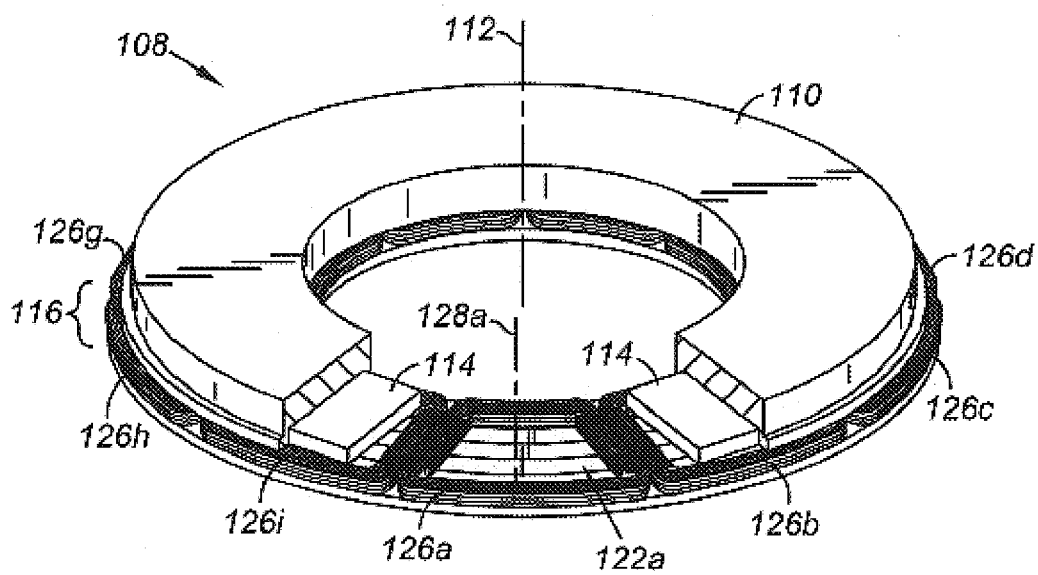
FIG. 7 is a perspective view of a spindle motor according to an aspect of the present invention including the stator rim of FIG. 6 and a spindle motor hub and magnet element.

Referring now to FIGS. 5–7, according to another aspect of the present invention, there is provided a spindle motor 108 for use in a disk drive 10. The spindle motor 108 includes a spindle motor hub 110 having an axis of rotation 112. The spindle motor 108 further includes an annular magnet element 114 attached to the spindle motor hub 110. The spindle motor 108 further includes a spindle motor stator 116. The spindle motor stator 116 includes a stator rim 118 formed of a plurality of laminate layers 120a–f concentrically disposed about the axis of rotation 112. The stator rim 118 has a plurality of stator teeth portions 112a–i in operable communication with the magnet element 114 for rotating the spindle motor hub 110. The stator teeth portions 112a–i each have a magnetic flux surface 124a–i disposed orthogonal to the axis of rotation 112. The spindle motor stator 116 further includes a plurality of windings 126a–i distributed along the stator rim 118. The windings 126a–i each has a winding axis 128a–i disposed parallel to the axis of rotation 90 and disposed about respective ones of the stator teeth portions 122a–i. In this embodiment, the stator rim 118 is disk shaped or flat. In comparison to the embodiment shown in FIGS. 2–4, a vertical gap is included (corresponding to the height of the windings 126a–i) which effectively displaces the magnetic flux surfaces 124a–i from the magnet element 114, thereby relatively reducing the torque that may be generated by the spindle motor 108. However, it is contemplated that with the stator rim 118 being flat in configuration, fabrication of the stator rom 118 avoids fabrication processes for forming the stator teeth portions 122a–i (to extend for example).

We claim:

1. A spindle motor for use in a disk drive, the spindle motor comprising:
    a spindle motor hub having an axis of rotation;
    an annular magnet element attached to the spindle motor hub; and
    a spindle motor stator including:
        a stator rim formed of a plurality of laminate layers concentrically disposed about the axis of rotation, the stator rim having a substantially uniform dimension along the axis of rotation, the stator rim having a plurality of stator teeth portions in operable communication with the magnet element for rotating the spindle motor hub, the stator teeth portions each having a magnetic flux surface disposed orthogonal to the axis of rotation; and a plurality of windings distributed along the stator rim, the windings each having a winding axis parallel to the axis of rotation and being disposed about respective ones of the stator teeth portions.

2. The spindle motor of claim 1 wherein the stator teeth portions extend from the stator rim along the axis of rotation.

3. The spindle motor of claim 1 wherein the stator rim is disk shaped.

4. The spindle motor of claim 1 wherein the stator rim is flat.

5. A disk drive comprising:

a disk drive base;

a spindle motor attached to the disk drive base including:

a spindle motor hub having an axis of rotation;

an annular magnet element attached to the spindle motor hub; and a spindle motor stator including:

a stator rim formed of a plurality of laminate layers concentrically disposed about the axis of rotation, the stator rim having a substantially uniform dimension along the axis of rotation, the stator rim having a plurality of stator teeth portions in operable communication with the magnet element for rotating the spindle motor hub, the stator teeth portions each having a magnetic flux surface disposed orthogonal to the axis of rotation; and a plurality of windings distributed along the stator rim, the windings each having a winding axis parallel to the axis of rotation and being disposed about respective ones of the stator teeth portions.

6. The disk drive of claim 5 wherein the stator teeth portions extend from the stator rim along the axis of rotation.

7. The disk drive of claim 5 wherein the stator rim is disk shaped.

8. The disk drive of claim 5 wherein the stator rim is flat.

\* \* \* \* \*